July 21, 1964 K. VÖGTLIN 3,141,726
TACHOGRAPH HAVING MEANS FOR MAKING A REFERENCE LINE
Filed Jan. 25, 1962
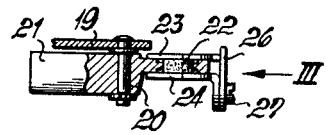
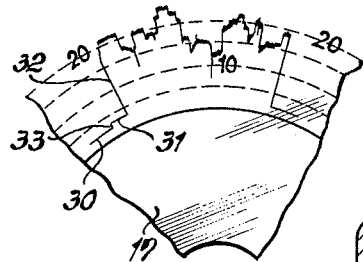
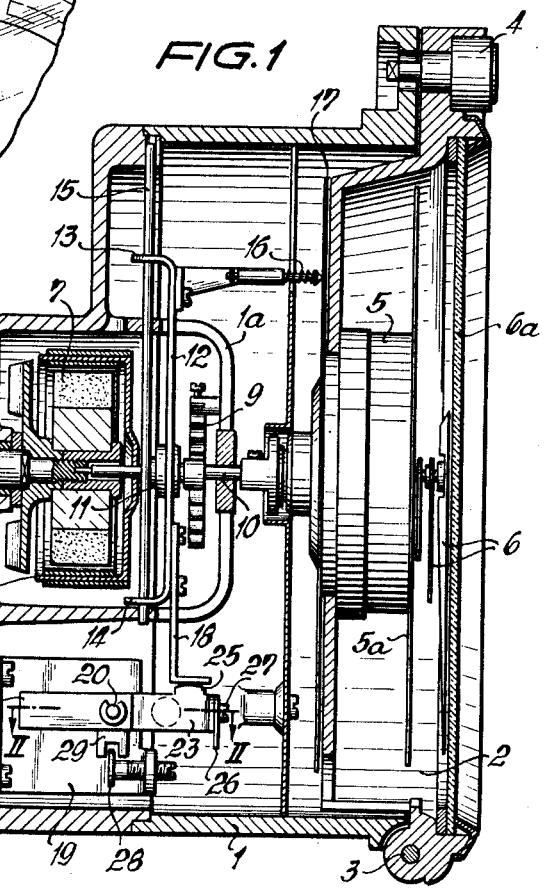
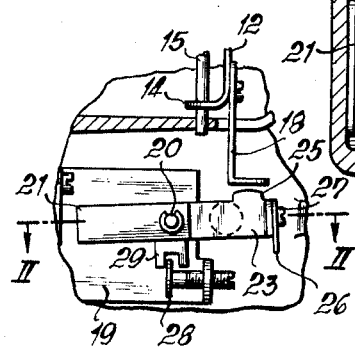
INVENTOR
Karl Vögtlin
by:
Michael S. Striker
Attorney

United States Patent Office 3,141,726
Patented July 21, 1964

3,141,726
TACHOGRAPH HAVING MEANS FOR MAKING A REFERENCE LINE
Karl Vögtlin, Villingen, Black Forest, Germany, assignor to Kienzle Apparate G.m.b.H., Villingen, Black Forest, Germany
Filed Jan. 25, 1962, Ser. No. 168,724
Claims priority, application Germany Jan. 31, 1961
10 Claims. (Cl. 346—23)

The present invention relates to a tachograph having means for making a reference line, and more particularly to apparatus in which a reference line representing a true polar axis is automatically drawn on a record carrier when the vehicle controlling the tachograph is started.

In recording tachographs to which the present invention relates, a time-velocity graph is recorded on a rotating record carrier which generally is provided in the form of a diagram sheet having radial and circular lines. The velocity of the vehicle is represented by radial vectors, and the time is represented by the circular lines. Recordings of this kind are used to establish the cause of accidents, and the speed, acceleration and deceleration of the vehicle, as represented by the graph on the diagram sheet, are interpreted to decide the cause of the accident.

Exact measurements on the record carrying diagram sheets are difficult since the angular velocity of the record carriers is very low due to the fact that one revolution is completed in twenty-four hours. A microscopic examination, or a substantial photographic enlargement is necessary for the interpretation of the velocity-time graph. However, since it is impossible to mount the record carriers in such a position that the center of the radial and circular lines thereon exactly coincides with the axis of rotation of the support, and further in such a manner that the theoretically exactly radial movement of the recording member produces a line extending exactly in the direction of the radial printed lines on the record carrier, the actual values cannot be exactly determined by relating the recorded graph to the printed radial and circular lines of the record carrier.

A true polar axis, and accurate reference line for the particular tachograph and record carried mounted thereon, is obtained when the recording member moves at a speed corresponding to an extremely high acceleration of the vehicle, and at least to the maximal acceleration of the vehicle. Since the record carrier turns at a very slow rotary speed, the recording member, moving at a very high speed, will produce a truly radial reference line which is far more accurate than the radial lines printed on the record carrier.

It is one object of the present invention to provide in a recording tachograph, means for making a radial reference line constituting a true polar axis.

It is another object of the present invention to provide in a recording tachograph means for making a radial reference line when the vehicle is started.

It is another object of the present invention to provide in a recording tachograph means for automatically making a radial reference line.

It is a further object of the present invention to provide in a recording tachograph means for making a radial reference line which do not require actuation by aditional devices or by an operator.

With these objects in view, the present invention relates to a recording tachograph which comprises means for rotating a record carrier at a uniform speed about an axis, a recording member movable in a substantially radial direction relative to the axis of the record carrier, and tachometric means for moving the recording member between a first end position corresponding to a standstill and a second end position corresponding to the maximum speed of a vehicle controlling the tachometric means. A velocity-time graph is recorded on the record carrier by the recording member.

In accordance with the present invention, retaining means are mounted on the casing of the tachograph, and a force-connected coupling means, preferably including a permanent magnet, connects the retaining means with the recording member in the first end position of the recording member. Consequently, the recording member is retained until the force exerted by the tachometric means on the recording member at a certain selected speed, is sufficient to overcome the coupling force of the force-connected coupling means and to disengage the same. The released recording member moves at a speed corresponding at least to the maximal acceleration of the vehicle, to a position corresponding to the above-mentioned certain selected speed, and records a reference line which is a true polar axis for the velocity-time graph recorded on the record carrier during operation of the vehicle. When examination of the velocity-time graph becomes necessary, circular arcs at right angles to the reference line and extending between points of the graph, accurately represent time intervals.

Since the reference line is recorded at the selected speed of the vehicle, the time of actual start of the vehicle would not be recorded on the record carrier. In order to produce a recording indicating the exact starting time of the vehicle, the retaining means is movable a short distance between two terminal positions, so that at the start of the movement of the vehicle and of the tachometric means, the retaining means performs a short movement to its terminal position, permitting the recording member to move a corresponding distance, and to make a short substantially radial recording on the record carrier which indicates the time of the start of the operations. Since the retaining means cannot move beyond this terminal position, the recording member is retained until the vehicle has attained such a speed that the torque exerted by the tachometric means on the recording member is sufficient to separate the recording member from the retaining means, for example, by overcoming the magnetic force exerted by a permanent magnet carried by the retaining means and attracting the recording member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGURE 1 is an axial sectional view through a recording tachograph in accordance with the present invention;

FIG. 1a is a fragmentary sectional view illustrating another operational position of elements shown in FIG. 1;

FIG. 2 is a fragmentary sectional view taken on line II—II in FIG. 1;

FIG. 3 is a fragmentary view taken in the direction of the arrow 3 in FIG. 2; and FIG. 4 is a fragmentary view illustrating a portion of the record carrier or diagram sheet with a velocity-time graph recorded by the apparatus of the present invention.

Referring now to the drawings, and more particularly to FIG. 1, a tachograph has a main casing portion 1, and a cover portion 2 which is mounted on casing portion 1 on pivot means 3. A lock 4 is provided for preventing opening of the casing by unauthorized persons.

The cover 2 supports a clock-work 5 and pointers 6 for indicating the time and driving speed. A dial 5a can be observed through a glass plate 6a.

A permanent magnet 7 is rotatably mounted on a support in casing portion 1, and is driven from a vehicle, on which the tachograph is mounted, through a shaft 7a. A bell-shaped rotor 8 surrounds the rotary magnet 7, and is connected by a shaft to one end of a spiral spring 9 whose other end is secured to the support 1a. When magnet 7 rotates in accordance with the driving speed of the vehicle, an eddy current is created in the bell-shaped member 8 so that a driving torque is transmitted to member 8 which turns until spring 9 is sufficiently tensioned to counterbalance the torque in a position of member 8 which corresponds to the speed at which magnet 7 is rotated, and to the speed at which the vehicle moves. A gear 11 is secured to shaft 10 and meshes with a rack bar 12 having lateral projections 13 and 14 at the ends thereof. A guide rod 15 passes through guide bores in projections 13 and 14 so that the rack bar 12 is mounted for straight movement and is shifted to positions corresponding to the angular positions assumed by member 8 in accordance with the speed of the vehicle.

A recording member 16 is secured to rack bar 12 and has a point moving over a record carrier 17 which is shown to be a circular diagram sheet 17. The record carrier 17 is secured to a suitable holder which is rotated by clock-work 5, so that record carrier 17 performs one revolution in twelve, or preferably in twenty-four hours. Guide means 15, rack bar 12, and recording member 16 are constructed in such a manner that the recording member 16 moves in radial direction with respect to the axis of rotation of the holder for the record carrier 17, but due to certain inaccuracies which are unavoidable in mounting the cover 2, this theoretical condition is not always obtained. Furthermore, the record carrier may have circular lines printed thereon whose center is intended to coincide with the axis of rotation, and radial lines printed thereon along which the recording member 16 is intended to move. However, these conditions cannot be obtained in practice, and consequently printed lines on the record carrier cannot be used for very exactly interpreting a velocity-time diagram recorded on the record carrier.

A supporting plate 19 is secured to casing portion 1, and carries a pivot pin 20 on which a retaining means in the form of a lever 21 is mounted for turning movement. Retaining lever 29 has a forked part 29 whose prongs are located on opposite sides of the projecting head of a screw 28 mounted in a threaded bore of a projection on supporting plate 19. Consequently, turning movement of retaining lever 21 is limited, and retaining lever 21 is stopped by the adjustable stop member 28 in two terminal positions.

As best seen in FIG. 2, retaining lever 21 has a thin end portion with an opening in which a permanent magnet 22 is mounted. Armature plates 23 and 24 are secured to lever 21 on opposite sides of the permanent magnet 22. Armature plates 23 and 24 have transverse projections 25 cooperating with a transverse projection at the end of a magnetizable member 18 which is secured to rack bar 12 and consequently moves with recording member 16.

The armature plate 24 has a transverse projection on which a magnetizable shunt plate 26 is mounted for turning movement about a screw 27, so that shunt member 26 can be adjusted and then secured whereby the magnetic flux of permanent magnetic 22 is varied, and the magnet force attracting member 18 is adjusted.

The apparatus operates in the following manner: When the vehicle is started, shaft 7a turns with magnet 7 so that a small torque is exerted on member 8 by the eddy current. Member 8 turns gear 11 so that rack 12 and recording member 16 are shifted. Since the magnet coupling means 18, 22, 23, 24, 25 connect the recording member with the retaining lever 21, retaining lever 21 is turned in counterclockwise direction as viewed in the drawing until it reaches a terminal position in which further movement is blocked by stop 28. Consequently, even though the speed of the vehicle, and the torque exerted on member 8 increases, the recording member cannot move farther in radial direction to a position corresponding to the increased speed of the vehicle.

The circular portion 30 of the diagram shown in FIG. 4 indicates that the vehicle and recording member did not move while the clock-work 5 rotated record carrier 17. The short radial line 33 is recorded when the vehicle starts to move and the recording member moves a short distance as far as the limited angular turning movement of retaining means 21 will permit. The recording member is now temporarily blocked in this radial position while the clock-work continues to rotate the record carrier 17 whereby the circular line 31 is drawn on the record carrier.

During the time in which the graph portion 31 is recorded, the speed of the vehicle increases, and a greater torque is exerted by member 7 on member 8 so that the force acting on member 8 also increases. At a certain speed the force acting on member 18 and recording member 16 exceeds the magnet force exerted by permanent magnet 24 on member 18, so that member 18 is torn off the armature projections 25, as shown in FIG 1a. Since spring 9 is not tensioned and the torque is suddenly applied to member 12, 18, 16, the recording member 16 moves very rapidly to an end position representing the actual speed of the vehicle. During this rapid movement, the line 32 is recorded, and this line constitutes a reference line and true polar axis for the velocity-time graph recorded by the recording member 16 in the particular tachograph and on the used record carrier 17.

In the example illustrated in FIG. 4, the magnet coupling means is disconnected at a speed of 20 miles per hour. By adjusting the position of shunt member 26, the magnet force of the magnet coupling can be adjusted so that the speed at which the magnet coupling is disconnected and the reference line recorded can be selected. During the further operation of the vehicle, a velocity-time graph is recorded by recording member 16, and when the vehicle is stopped, recording member 16 is moved inwardly by spring 9 until first member 18 abuts projections 25, whereupon retaining lever 21 is turned in clockwise direction to its other terminal position abutting stop 28.

When the velocity-time graph has to be interpreted by microscopic examination after an accident, the time periods between the recordings of certain points of the graph are determined by measuring along circular arcs extending at right angles to the reference line 32. In this manner polar coordinates are obtained which are the true coordinates for the actually recorded graph and permit a correct interpretation of the graph.

It will be understood that each of the elements described above, or two or more together, may also find a useful application in other types of tachographs differing from the types described above.

While the invention has been illustrated and described as embodied in a means for making a reference line constituting a true polar axis of a graph recorded by a tachograph, it is not intended to be limited to the details shown, since various modifications and structural changes may be made without departing in any way from the spirit of the present invention.

What is claimed as new and desired to be secured by Letters Patent is:

1. In a recording tachograph, in combination a support; means mounted on said support for rotating a record carrier at a uniform speed about an axis; a recording member mounted on said support for movement in a substantially radial direction relative to said axis and adapted to record a graph on said record carrier; tachometric means mounted on said support and operatively connected to said recording member and exerting on the same a force corresponding to the speed measured by said tachographic means for moving said recording member between a first end position corresponding to standstill, and a second end position corresponding to the maximum speed of a vehicle controlling said tachometric means so that during operation of the vehicle a velocity-time graph is recorded on the record carrier; retaining means mounted on said support; a force-connected coupling means connecting said retaining means with said recording member in said first end position of said recording member so that said retaining member retains said recording member until the force exerted by said tachometric means on said recording member at a selected speed of said tachometric means is sufficient to overcome the coupling force of said force-connected coupling means and to disengage the same so that said recording member moves at a speed corresponding at least to the maximal acceleration of the vehicle to a position corresponding to said selected speed whereby a reference line representing a true polar axis for a velocity-time graph is recorded on the record carrier so that circular arcs at right angles to said reference line and extending between points of said graph accurately represent time intervals.

2. In a recording tachograph, in combination, a support; means mounted on said support for rotating a record carrier at a uniform speed about an axis; a recording member mounted on said support for movement in a substantially radial direction relative to said axis and adapted to record a graph on said record carrier; tachometric means mounted on said support and operatively connected to said recording member and exerting on the same a force corresponding to the speed measured by said tachographic means for moving said recording member between a first end position corresponding to standstill, and a second end position corresponding to the maximum speed of a vehicle controlling said tachometric means so that during operation of the vehicle a velocity-time graph is recorded on the record carrier; retaining means movably mounted on said support; stop means for limiting movement of said retaining means; a force-connected coupling means connecting said retaining means with said recording member in said first end position of said recording member so that said retaining member first moves with said recording member and then abuts said stop means so as to retain said recording member until the force exerted by said tachometric means on said recording member at a selected speed of said tachometric means is sufficient to overcome the coupling force of said force-connected magnetic coupling means and to disengage the same so that said recording member moves at a speed corresponding at least to the maximal acceleration of the vehicle to a position corresponding to said selected speed whereby a reference line representing a true polar axis for a velocity-time graph is recorded on the record carrier so that circular arcs at right angles to said reference line and extending between points of said graph accurately represent time intervals.

3. In a recording tachograph, in combination, a support; means mounted on said support for rotating a record carrier at a uniform speed about an axis; a recording member mounted on said support for movement in a substantially radial direction relative to said axis and adapted to record a graph on said record carrier; tachometric means mounted on said support and operatively connected to said recording member and exerting on the same a force corresponding to the speed measured by said tachographic means for moving said recording member between a first end position corresponding to standstill, and a second end position corresponding to the maximum speed of a vehicle controlling said tachometric means so that during operation of the vehicle a velocity-time graph is recorded on the record carrier; retaining means mounted on said support; a force-connected magnetic coupling means including a permanent magnet for connecting said retaining means with said recording member in said first end position of said recording member so that said retaining member retains said recording member until the force exerted by said tachometric means on said recording member at a selected speed of said tachometric means is sufficient to overcome the magnetic coupling force of said permanent magnet and to separate said recording member from said permanent magnet so that said recording member moves at a speed corresponding at least to the maximal acceleration of the vehicle to a position corresponding to said selected speed whereby a reference line representing a true polar axis for a velocity-time graph is recorded on the record carrier so that circular arcs at right angles to said reference line and extending between points of said graph accurately represent time intervals.

4. In a recording tachograph, in combination, a support; means mounted on said support for rotating a record carrier at a uniform speed about an axis; a recording member mounted on said support for movement in a substantially radial direction relative to said axis and adapted to record a graph on said record carrier; tachometric means mounted on said support and operatively connected to said recording member for moving the same between a first end position corresponding to standstill, and a second end position corresponding to the maximum speed of a vehicle controlling said tachometric means so that during operation of the vehicle a velocity-time graph is recorded on the record carrier; a retaining means movably mounted on said support; a stop means for limiting movement of said retaining means in two terminal positions; a force-connected magnetic coupling means including a permanent magnet secured to said retaining means and magnetically holding said recording member for connecting said retaining means with said recording member in said first end position of said recording member so that said retaining means first moves to one of said terminal positions when said tachometric means exerts a force on said recording member whereupon said recording member is retained until the force exerted by said tachometric means on said recording member at a selected speed of said tachometric means is sufficient to overcome the magnetic coupling force of said permanent magnet and to separate said recording member from said permanent magnet so that said recording member moves at a speed corresponding at least to the maximal acceleration of the vehicle to a position corresponding to said selected speed whereby a reference line representing a true polar axis for a velocity-time graph is recorded on the record carrier so that circular arcs at right angles to said reference line and extending between points of said graph accurately represent time intervals.

5. A recording tachograph as set forth in claim 4 and wherein said retaining means includes a lever turnably mounted on said support and carrying said permanent magnet at one end thereof, two armature members secured to said lever on opposite sides of said permanent magnet, and a shunt member for magnetically connecting said armature members and being adjustably mounted on one of said armature members so that by adjustment of said shunt member the magnetic coupling force of said magnetic coupling means can be adjusted.

6. A recording tachograph as set forth in claim 4 wherein said stop means is adjustably mounted on said support, so that said terminal positions of said retaining means can be adjusted.

7. In a recording tachograph, in combination, a support; means mounted on said support for rotating a record carrier at a uniform speed about an axis; a recording member mounted on said support for movement in a substantially radial direction relative to said axis and adapted to record a graph on said record carrier; tachometric means mounted on said support including a member driven from a vehicle, and another member force-connected to said driven member and operatively connected to said recording member and exerting on the same a force corresponding to the speed measured by said tachographic means for moving said recording member between a first end position corresponding to standstill, and a second end position corresponding to the maximum speed of the vehicle controlling said tachometric means so that during operation of the vehicle a velocity-time graph is recorded on the record carrier; retaining means mounted on said support; a force-connected coupling means connecting said retaining means with said recording member in said first end position of said recording member so that said retaining member retains said recording member until the force exerted by said tachometric means on said recording member at a selected speed of said tachometric means is sufficient to overcome the coupling force of said force-connected coupling means and to disengage the same so that said recording member moves at a speed corresponding at least to the maximal acceleration of the vehicle to a position corresponding to said selected speed whereby a reference line representing a true polar axis for a velocity-time graph is recorded on the record carrier so that circular arcs at right angles to said reference line and extending between points of said graph accurately represent time intervals.

8. In a recording tachograph, in combination, a support; means mounted on said support for rotating a record carrier at a uniform speed about an axis; a recording member mounted on said support for movement in a substantially radial direction relative to said axis and adapted to record a graph on said record carrier; tachometric means mounted on said support including a member driven from a vehicle, and another member force-connected to said driven member and operatively connected to said recording member and exerting on the same a force corresponding to the speed measured by said tachographic means for moving said recording member between a first end position corresponding to standstill, and a second end position corresponding to the maximum speed of the vehicle controlling said tachometric means so that during operation of the vehicle a velocity-time graph is recorded on the record carrier; retaining means mounted on said support; a force-connected magnetic coupling means including a permanent magnet secured to said retaining means and magnetically holding said recording member for connecting said retaining means with said recording member in said first end position of said recording member so that said retaining member retains said recording member until the force exerted by said tachometric means on said recording member at a selected speed of said tachometric means is sufficient to overcome the magnetic coupling force of said permanent magnet and to separate said recording member from said permanent magnet so that said recording member moves at a speed corresponding at least to the maximal acceleration of the vehicle to a position corresponding to said selected speed whereby a reference line representing a true polar axis for a velocity-time graph is recorded on the record carrier so that circular arcs at right angles to said reference line and extending between points of said graph accurately represent time intervals.

9. In a recording tachograph, in combination, a support; means mounted on said support for rotating a record carrier at a uniform speed about an axis; a recording member mounted on said support for movement in a substantially radial direction relative to said axis and adapted to record a graph on said record carrier; tachometric means mounted on said support including a member driven from a vehicle, and another member force-connected to said driven member and operatively connected to said recording member and exerting on the same a force corresponding to the speed measured by said tachographic means for moving said recording member between a first end position corresponding to standstill, and a second end position corresponding to the maximum speed of the vehicle controlling said tachometric means so that during operation of the vehicle a velocity-time graph is recorded on the record carrier; retaining means mounted on said support; a force-connected coupling means including means for adjusting the coupling force, said coupling means connecting said retaining means with said recording member in said first end position of said recording member so that said retaining member retains said recording member until the force exerted by said tachometric means on said recording member at a selected speed of said tachometric means determined by adjustment of said adjusting means is sufficient to overcome the coupling force of said force-connected coupling means and to disengage the same so that said recording member moves at a speed corresponding at least to the maximal acceleration of the vehicle to a position corresponding to said selected speed whereby a reference line representing a true polar axis for a velocity-time graph is recorded on the record carrier so that circular arcs at right angles to said reference line and extending between points of said graph accurately represent time intervals.

10. In a recording tachograph, in combination, a support; means mounted on said support for rotating a record carrier at a uniform speed about an axis; a recording member mounted on said support for movement in a substantially radial direction relative to said axis and adapted to record a graph on said record carrier; tachometric means mounted on said support including a member driven from a vehicle, and another member force-connected to said driven member and operatively connected to said recording member and exerting on the same a force corresponding to the speed measured by said tachographic means for moving said recording member between a first end position corresponding to standstill, and a second end position corresponding to the maximum speed of the vehicle controlling said tachometric means so that during operation of the vehicle a velocity-time graph is recorded on the record carrier; retaining means mounted on said support; a force-connected coupling means including a permanent magnet secured to said retaining means and magnetically holding said recording member for including means for adjusting the magnetic coupling force, said coupling means connecting said retaining means with said recording member in said first end position of said recording member so that said retaining member retains said recording member until the force exerted by said tachometric means on said recording member at a selected speed of said tachometric means determined by adjustment of said adjusting means is sufficient to overcome the coupling force of said permanent magnet and to separate said recording member from said permanent magnet so that said recording member moves at a speed corresponding at least to the maximal acceleration of the vehicle to a position corresponding to said selected speed whereby a reference line representing a true polar axis for a velocity-time graph is recorded on the record carrier so that circular arcs at right angles to said reference line and extending between points of said graph accurately represent time intervals.

References Cited in the file of this patent

UNITED STATES PATENTS

| | | |
|---|---|---|
| 1,001,220 | Phelps | Aug. 22, 1911 |
| 1,198,227 | Hinchey | Sept. 12, 1916 |
| 2,099,849 | Holmes | Nov. 23, 1937 |
| 2,933,363 | Riegger et al. | Apr. 19, 1960 |